United States Patent [19]

Fletcher et al.

[11] 3,732,409

[45] May 8, 1973

[54] COUNTING DIGITAL FILTERS

[76] Inventors: James C. Fletcher, Administrator of the National Aeronautics and Space Administration with respect to an invention of; Shalhav Zohar, Sunland, Calif.

[22] Filed: Mar. 20, 1972

[21] Appl. No.: 236,285

[52] U.S. Cl. ....................235/164, 328/167, 235/152

[51] Int. Cl.............................G06f 7/38, G06f 15/34

[58] Field of Search......................235/164, 156, 152; 328/167; 325/42, 323

[56] References Cited

UNITED STATES PATENTS

| | | | |
|---|---|---|---|
| 3,610,901 | 10/1971 | Lynch | 235/152 |
| 3,665,171 | 5/1972 | Morrow | 235/152 |
| 3,683,162 | 8/1972 | Jacob | 235/156 |

*Primary Examiner*—Malcolm A. Morrison
*Assistant Examiner*—David H. Malzahn
*Attorney*—Monte F. Mott et al.

[57] ABSTRACT

Several embodiments of a counting digital filter of the non-recursive type are disclosed. In each embodiment two registers, at least one of which is a shift register, are included. The shift register receives $J_x$-bit data input words bit by bit. The $k$th data word is represented by the integer $$x_k = \sum_{j=0}^{J_x-1} v_{kj}(-2)^j, \text{ wherein } v_{kj}=0,\ 1$$

In the shift register wherein the data words are fed in a monotonic word index sequence, they are separated by $J_a-1$ spacing zero bits, where $J_a$ represents the number of bits of each of K filter coefficients stored in the other register. The $k$th filter coefficient is represented by the integer $$a_k = \sum_{j=0}^{J_a-1} u_{kj}(-2)^j \text{ wherein } u_{kj}=0,\ 1$$

An output sample $y_m$ is computed as a function of J components in accordance with the expression $$y_m = \sum_{r=0}^{J-1} (h_r)_m(-2)^r$$

J is equal to $J_a+J_x-1$. The $(h_r)_m$'s are functions of the bits of the coefficients and data words in accordance with the expression $$(h_r)_m = \sum_{k=0}^{K-1}\sum_{i=0}^{J_a-1} u_{ki}v_{m-k,r-i}$$

Since the products in the last expression involve binary quantities only, each of them is determined as the output of a two-input AND gate. The double summation is carried out simply by counting all TRUE AND gates.

24 Claims, 17 Drawing Figures

COUNTING DIGITAL FILTERS

ORIGIN OF INVENTION

The invention described herein was made in the performance of work under a NASA contract and is subject to the provisions of Section 305 of the National Aeronautics and Space Act of 1958, Public Law 85–568 (72 Stat. 435; 42 U.S.C. 2457).

BACKGROUND OF THE INVENTION

1. Field of the Invention

The present invention is generally directed to filtering circuitry and, more particularly, to a non-recursive digital filter.

2. Description of the Prior Art

The advantages of a digital filter over an electrical filter are well known. These include the ability of a digital filter to perform filtering functions which are hard or impossible to be realized with an electric filter. Another advantage is the flexibility of the digital filter. The same physical digital device can often provide a large variety of filtering functions simply by feeding it with different sets of filter coefficients.

Briefly, a digital filter consists of three basic parts. It includes an analog-to-digital converter (ADC) which samples the input signal voltage to be filtered at closely spaced intervals producing a set of numbers, which are the digital samples. These numbers in conjunction with a set of numbers, known as filter coefficients and which control the filtering function, are operated upon by computer-like circuitry to yield computed numerical values of samples of the filter output. The latter are supplied to a digital-to-analog converter (DAC) which constructs the continuous output voltage therefrom.

In a digital filter of the non-recursive type, the computations performed to obtain the output samples consist of multiplication and addition. If the non-recursive digital filter to be realized calls for K filter coefficients, each output sample is obtained by multiplying each of the last K input samples by the proper filter coefficient and then summing these K products. Present designs are based on an implementation of such a computation, using at least one multiplier and one adder. The multiplier computes the K products in sequence, while the adder accumulates these K products to generate the output sample.

Although prior art non-recursive digital filters operate satisfactorily, it is believed that they perform computations which are not necessary for their proper operations. It is submitted that constructing the K products as intermediate results is not necessary and is, in some sense, wasteful. The elimination of the construction of the K products as intermediate results would result in a simpler digital filter, and hence, lower cost for comparable performance.

OBJECTS AND SUMMARY OF THE INVENTION

It is a primary object of the present invention to provide a new non-recursive digital filter.

Another object of the present invention is to provide a non-recursive digital filter in which a new computation technique is employed.

A further object of the invention is to provide a novel, relatively simple, non-recursive digital filter in which K products as intermediate results are not produced as part of the computation.

These and other objects of the present invention are achieved by providing a non-recursive digital filter in which a set of intermediate entities is obtained through counting, and therefore the novel filter of the present invention may hereafter be referred to as a counting digital filter. Briefly it includes two registers, at least one of which is of the shift type. The numbers representing the input samples, are fed or clocked sequentially into the shift register. The other register holds the filter coefficients. In one embodiment a plurality of two-input AND gates interconnect stages or cells of the two registers. After each bit of each input number is clocked into the shift register the gates providing TRUE outputs are counted. The count is accumulated in an accumulator, in manner to be described hereafter, to provide an output number, representing an output sample after all the bits of a complete input sample have been fed into the shift register. The implementation of the novel filter is greatly enhanced by representing each number in the registers as a sum of powers of (−2), while using a standard binary accumulator, in which numbers are represented as a sum of powers of +2.

The novel features of the invention are set forth with particularity in the appended claims. The invention will best be understood from the following description when read in conjunction with the accompanying drawings.

DESCRIPTION OF THE PREFERRED EMBODIMENTS

Figure 1:
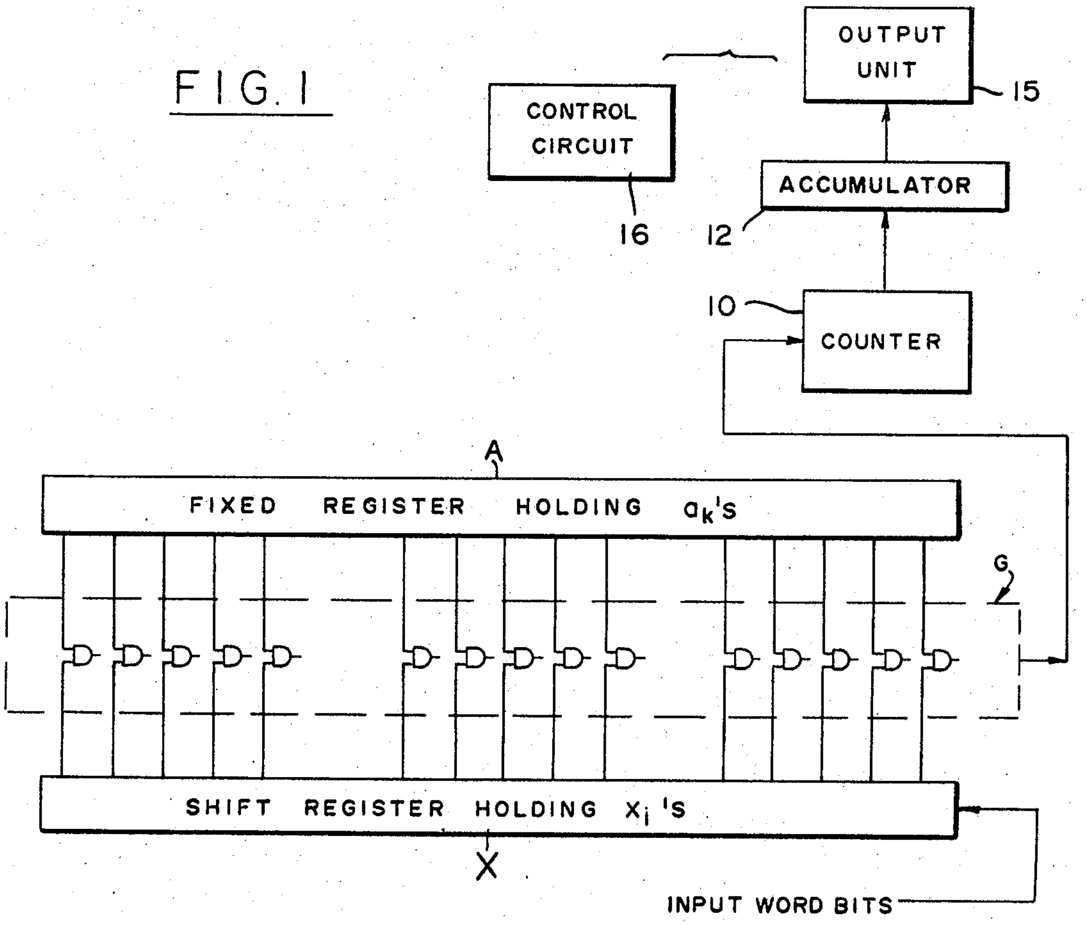
FIG. 1 is a simplified block diagram of one embodiment of the invention.

The novelty of the present invention may best be highlighted by first summarizing the conventional computations performed in a conventional non-recursive digital filter, followed by an analysis of the computation technique used in the counting digital filter of the present invention. These presentations will be followed by the description of a simple basic embodiment of the invention, which assumes that all numbers are positive. Thereafter, this restriction will be removed by describing the embodiment, in which numbers are represented as powers of (−2).

A filter transforms its input time function $\epsilon(t)$, to the filtered time function $\eta(t)$. A conventional non-recursive digital filter simulates such a filter by computing samples of the filtered signal, $$\eta_k=\eta(kT_s) \quad (1)$$

from samples of the input signal, $$\epsilon_k=\epsilon(kT_s), \quad (2)$$

according to the formula $$\eta_m=\sum_{k=0}^{K-1}\xi_{m-k}\alpha_k \quad (3)$$

in which the coefficients $\alpha_k$ are functions of the filter transfer function.

An obvious strategy in realizing such a filter is to compute $\eta_m$ via the following rephrasing of equation (3):

$$\left.\begin{aligned}P_{mk}&=\xi_{m-k}\alpha_k\\ \eta_m&=\sum_{k=0}^{K-1}P_{mk}\end{aligned}\right\} \quad (4)$$

That is, the desired output, $\eta_m$, is evaluated through the intermediate entities $p_{mk}$, which require the use of at least one multiplier. This is the basic strategy employed in all prior art non-recursive digital filters.

In accordance with the principles of the present invention a different strategy is employed. Herein the output is obtained by producing a different type intermediate entities. These entities are obtained by counting thus eliminating the multipliers. Let it be assumed temporarily that the data and coefficients satisfy $$\epsilon_k, \alpha_k \geq 0. \quad (5)$$

This assumption, which excludes negative numbers, simplifies the presentation of the main features of the invention and will be removed later in the presentation.

In representing $\epsilon_k$, $\alpha_k$ in the machine $J_x$ bits are assigned to each input data word and $J_a$ bits to each coefficient. Denoting by primes the truncated versions of $\epsilon_k$, $\alpha_k$ consistent with the finite $J_x$, $J_a$, the data and coefficients are representable by the integers $x_k$, $a_k$ defined as follows:

$$\left.\begin{aligned}\xi'_k&=2^{-X}x_k\\ \alpha'_k&=2^{-A}a_k\end{aligned}\right\} \quad (6)$$

Suitable values of A, X can be determined from the known ranges of $\alpha_k$, $\epsilon_k$.

The immediate effect of the above representation is that the machine will substitute the approximation $\eta_m'$ for the true $\eta_m$ where $$\eta'_m=\sum_{k=0}^{K-1}\xi'_{m-k}\alpha'_k \quad (7)$$

$\eta_m'$ may be regarded as a sample of the approximated output $\eta'(t)$.

It should be noted that the adopted representation is equivalent to a fixed point binary representation. Adaptations employing floating point representation for the coefficients are possible with a reasonable amount of extra hardware.

Substituting (6) in (7) one obtains $$y_m=\sum_{k=0}^{K-1}x_{m-k}a_k \quad (8)$$

where $$y_m=2^{(A+X)}\eta_m' \quad (9)$$

is an integer.

The implication of equation (8) can now be examined in terms of bit-level operations. The explicit binary representations of $a_k$, $x_k$ are:

$$\left.\begin{aligned}a_k&=\sum_{j=0}^{J_a-1}u'_{kj}2^j \qquad (u'_{kj}=0,1)\\ x_k&=\sum_{j=0}^{J_x-1}v'_{kj}2^j \qquad (v'_{kj}=0,1)\end{aligned}\right\} \quad (10)$$

Using the representation of equation (10) in equation (8), one obtains an explicit expression for $y_m$ as a triple sum $$y_m=\sum_{k=0}^{K-1}\sum_{r=0}^{J-1}\sum_{i=0}^{J_a-1}u'_{ki}v'_{m-k,r-i}2^r \quad (11)$$

where $$J=J_a+J_x-1 \quad (12)$$

Application of the "multiply-then-add" strategy of equation (4) is equivalent to summing over $i$, $r$ first (thus getting the $p_{mk}$'s) and only then performing the $k$ summation. In accordance with the present invention the order of summation is changed, making the $r$ summation the last one. Thus, denoting $$\sum_{k=0}^{K-1}\sum_{i=0}^{J_a-1}u'_{ki}v'_{m-k,r-i}=h'_r \quad (13)$$

yields $$y_m=\sum_{r=0}^{J-1}h'_r2^r \quad (14)$$

Strictly speaking, the entity defined in equation (13) should be denoted $(h_r')_m$. However, since in most of the following discussion $m$ is constrained to a specific constant value, the simpler notation, $h_r'$, will do.

Equations (13) and (14) embody the basic computation strategy employed in the counting digital filter of the present invention. As seen from equation (13) each element of the double sum is a product of two 1-bit entities. Such a product is either 0 or 1 and, practically speaking, no multiplication is involved in its evaluation. A dual input AND gate is all that is needed. Equation (13) is a summation of $KJ_a$ such terms. Thus, in a system in which $KJ_a$ dual input gates are fed by the pairs of bits specified in equation (13), a count of the number of TRUE gates, will equal $h_r'$.

Equation (14) is implemented by regarding its right hand side as a polynomial with coefficients $h_r'$, evaluated for the argument 2. Applying the well-known polynomial algorithm we get $$y_m=(\ldots(h'_{J-1}\cdot 2+h_{J-2}')2+\ldots+h_1')2+h_0'. \quad (15)$$

The realization of equation (15) can now be carried out in a sequence of shift and add operations in a standard accumulator.

Equations (13) and (14) may be implemented by circuitry, generally shown in FIG. 1, which represents a simplified block diagram of a basic embodiment of the counting digital filter of the present invention. It includes a register A which holds the coefficients $a_k$, prescribing the filter transfer function. Its content would normally stay fixed through-out a specific filter simulation. It may, however, be varied in the course of the filtering process to realize an adaptive filter. For serial loading register A is a shift register. However since during a specific filter simulation its content is fixed, it will be referred to as a fixed register. The digital filter includes a shift register X which holds the input words $x_i$. These are shown to be fed on the right, a bit at a time. As will be pointed out hereafter in the presently described embodiment, each input word is clocked-in, starting with its most significant bit while in register A each coefficient is stored with its most significant bit on the right.

Registers A and X are cross-linked by a plurality of AND gates, generally designated by G. The filter further includes a counter 10 and an accumulator 12. After every shift of register X the counter counts the number of TRUE AND gates. As will be shown in connection with a specific example, each count equals a specific $h_r'$ as represented by equation (13). The accumulator 12 combines J counter outputs through a shift and add sequence to generate an output word $y_m$, as expressed in equation (14).

The following description may best be further explained and summarized in connection with a specific example, wherein the following parameters are assumed, $K=3; J_a=5; J_x=3.$ These values, particularly K, are too low to be realistic. However, their adoption facilitates the presentation of detailed bit configurations in the two registers.

Figures 2A, 2B, 2C, 2D:
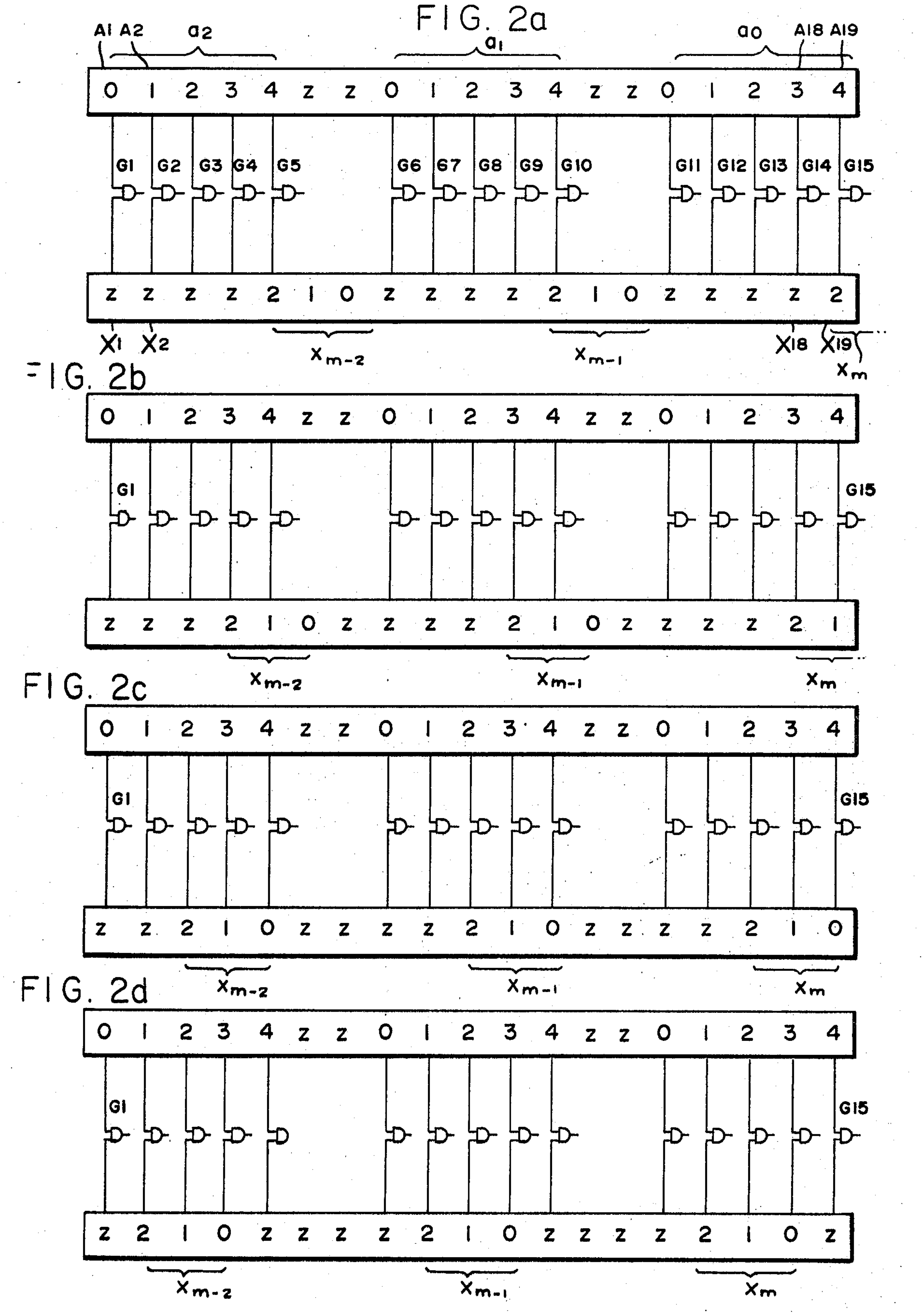
FIGS. 2*a* through 2*h* are diagrams useful in explaining the basic principles of the invention.
Figure 2E:
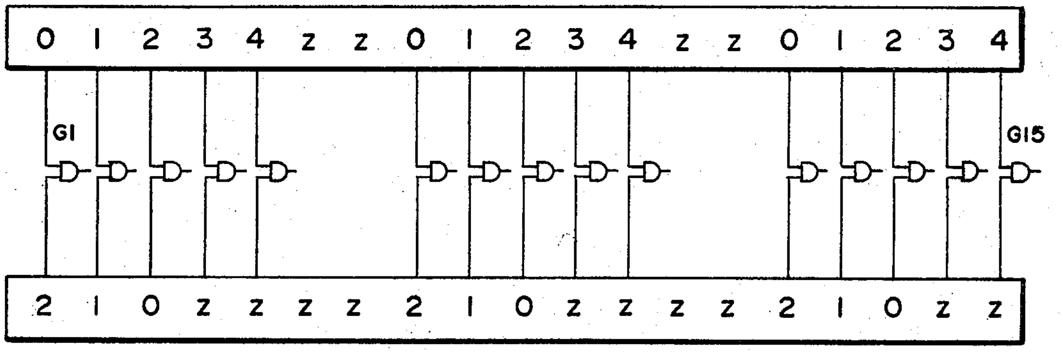
Figure 2F:
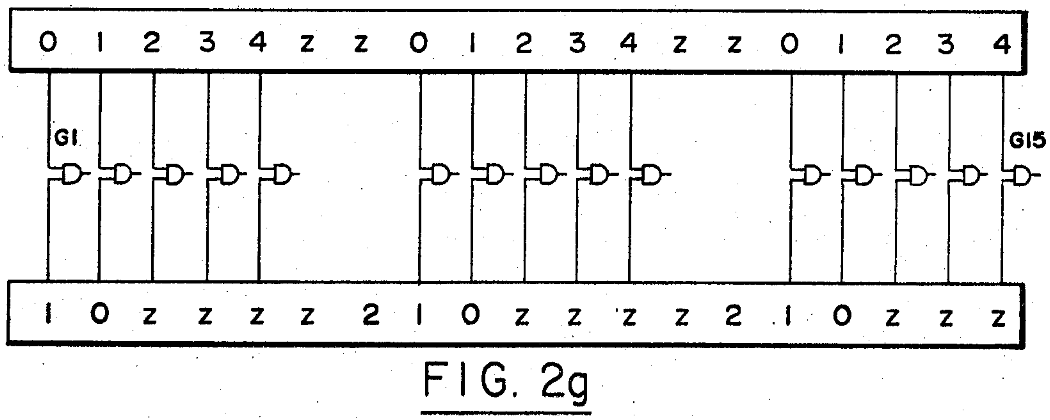

In FIG. 2*a* to which reference is made, the bit configuration is shown for the two registers after the highest order bit of an input word $x_m$ was fed into register X. Therein a numeral in a register cell represents the radix power assigned to a bit in that location. This power is referred to as the weight of the bit. It is convenient to designate the bit itself by its weight. Thus the first cell on the right of register A contains bit 4 of $a_o$ which is one of the coefficients. The other two coefficients are designated $a_1$ and $a_2$.

It should be noted that successive input words ($x_i$) are separated by $J_a-1=5-1=4$ zero spacing bits, which are designated by the letter $z$. Thus since each input word is of 3 bits, and the words are separated by 4 zero bits, it takes 7 bit times or shifts to feed one input word into register X.

In the A register a separation of $J_x-1=3-1=2$ zero bits is present between successive words. When the A register is of the shift type these zero bits are actually implemented by providing a register of KJ bits and storing two zero bits between successive coefficients as shown in FIG. 2*a*. Otherwise these bits can be eliminated by implementing the A register as K separate independent registers, each storing one of the filter coefficients, which in the present example is 5 bits long.

Figure 3:
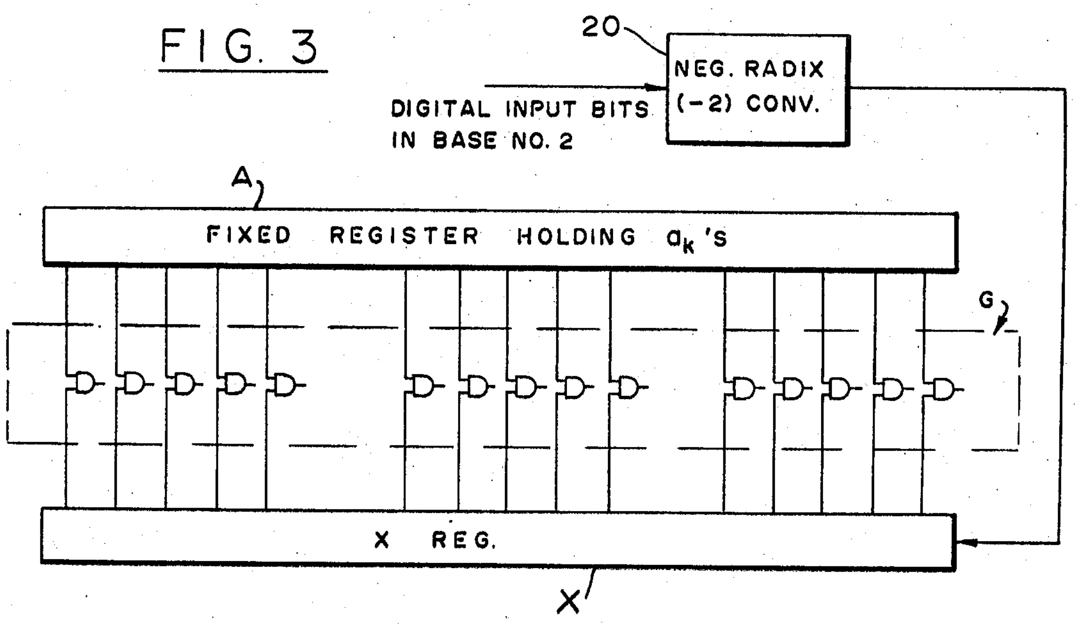
FIG. 3 is a simplified partial block diagram with a negative radix converter at the input of register X.

In FIG. 2*a* register A is shown including the two zero bits between successive coefficients. Thus its required cell or bit length is 3×5+2×2=19. These cells are designated A1–A19. Cells A1–A5 store $a_2$, cells A8–12 store $a_1$ and cells A15–A19 store $a_0$. The required cell length of register X is also 19 cells and are designated X1–X19. Fifteen AND gates G1–G15 cross-link appropriate cells of the two registers as shown in FIG. 3 so that for each step in the computation of $y_m$, the number of TRUE gates represents the proper value of $h_r'$ as represented by equation (13). In the particular example gates G1–G5 cross-link cells A1–A5 with cells X1–X5, gates G6–G10 cross-link cells A8–A12 with cells X8–X12 and gates G11–G15 cross-link cells A15–A19 with cells X15–X19.

Such a spacing and the reversed bit arrangement guarantee that all pairs of the bits feeding a common gate, satisfy the index relation required by equation (13). The double summation of equation (13) translates simply into a count of all TRUE gates of gates G1–G15. This may best be exemplified by a few examples.

Since J−1=6, the highest value of $r$ which is of interest is r=6. Thus equation (13) may be rewritten for $r$=6 as, $$h'_6=\sum_{k=0}^{2}\sum_{i=0}^{4}u'_{ki}v'_{m-k,6-i} \qquad (16)$$

Since the highest power of $J_x$ is 2, the lowest value of $i$ is 6−2=4. Thus $$h_6'=u_{0,4}'\,v_{m,2}'+u_{1,4}'\,v_{m-1,2}'+u_{2,4}'\,v_{m-2,2}' \qquad (17)$$

The term $u_{0,4}'v_{m-2}'$ is a binary 1 only if the bit of weight 4 of $a_0$ and the bit of weight 2 of $x_m$ are both binary 1's in which case gate G15 provides a true output. Similarly, $u_{1,4}'v_{m-1,2}'$ is a 1 if the highest order bits of $a_1$ and $x_{m-1}$ are 1's in which case gate G10 provides a true output. Likewise, $u_{2,4}'\,v_{m-2,2}'$ is a 1 when the highest order bits of $a_2$ and $x_{m-2}$ are 1's in which case gate G5 provides a true output. It is thus seen from FIG. 2*a* that $h_6'$ is obtained by determining the number of gates G5, G10 and G15 which are TRUE. All the other gates provide false outputs since at least one of their inputs is a zero. Thus by interrogating all the gates and counting the TRUE ones $h_6'$ is determined.

One bit period later the bit configuration is as shown in FIG. 2*b*. Expanding equation (13) for $h_5'$ it is seen that $$h_5'=u_{0,3}'\,v_{m,2}'+u_{0,4}'\,v_{m,1}'+u_{1,3}'\,v_{m-1,2}'+u_{1,4}'\,v_{m-1,1}'+u_{2,3}'\,v_{m-2,2}'+u_{2,4}'\,v_{m-2,1}'. \qquad (18)$$

From the foregoing it should be apparent that the outputs of gates G14, G15, G9, G10 and G4 and G5 provide the six terms which represent $h_5'$. The rest of the gates have false outputs since each is provided with at least one zero input. Thus after the second bit of $x_m$ is shifted into register X, as shown in FIG. 2*b*, the number of TRUE gates represents $h_5'$.

During the next bit period the lowest order bit of $x_m$ is clocked in as shown in FIG. 2*c*, followed by the successive feeding of four zeros as shown in FIGS. 2*d* through 2*g*. That after each clock period the sum of the TRUE gates represents the proper $h_r'$. This is apparent from the following expansions of $h_4'$–$h_0'$ and FIGS. 2*d* and 2*g*, respectively.

$$h_4' = u_{0,2}' v_{m,2}' + u_{0,3}' v_{m,1}' + u_{0,4}' v_{m,0}' + u_{1,2}' v_{m-1,2}' + + u_{1,3}' v_{m-1,1}' + u_{1,4}' v_{m-1,0}' + + u_{2,2}' v_{m-2,2}' + u_{2,3}' v_{m-2,1}\mathbf{a}\!: + u_{2,4}' v_{m-2,0}' \quad (19)$$

$$h_3' = u_{0,1}' v_{m,2}' + u_{0,2}' v_{m,1}' + u_{0,3}' v_{m,0}' + + u_{1,1}' v_{m-1,2}' + u_{1,2} v_{m-1,1}' + u_{1,3}' v_{m-1,0}' + + u_{2,1}' v_{m-2,2}' + u_{2,2}' v_{m-2,1}\mathbf{a}\!: + u_{2,3}' v_{m-2,0}' \quad (20)$$

$$h_2' = u_{0,0}' v_{m,2}' + u_{0,1}' v_{m,1}' + u_{0,2}' v_{m,0}' + + u_{1,0}' v_{m-1,2}' + u_{1,1}' v_{m-1,1}' + u_{1,2}' v_{m-1,0}' + + u_{2,0}' v_{m-2,2}' + u_{2,1}' v_{m-2,1}\mathbf{a}\!: + u_{2,2}' v_{m-2,0}' \quad (21)$$

$$h_1' = u_{0,0}' v_{m,1}' + u_{0,1}' v_{m,2}' + + u_{1,0}' v_{m-1,1}' + u_{1,1}' v_{m-1,2}' + + u_{2,0}' v_{m-2,1}' + u_{2,1}' v_{m-2,2}' \quad (22)$$

$$h_0' = u_{0,0}' v_{m,0}' + u_{1,0}' v_{m-1,0}' + u_{2,0}' v_{m-2,0}' \quad (23)$$

From the foregoing it is thus seen that the two registers A and X and, the 15 gates G1–G15 and the counter 10 combine to produce in succession $h_6'$ through $h_0'$, as each bit of the input word $x_m$ followed by four zero bits are successively shifted into the X register.

Attention is now directed to the construction of $y_m$. This is carried out in the accumulator 12 (FIG. 1) implementing equation (15). Briefly, in the present example after $h_6'$ is obtained as the output of counter 10, it is loaded into accumulator 12 and the filter proceeds to compute $h_5'$ by first shifting the second bit of $x_m$ into register X followed by counting the TRUE gates. Then the content of the accumulator is to the left one bit which is equivalent to multiplying its content by 2 to provide $h_6' \cdot 2$. Thereafter $h_5'$ is added to the accumulator so that its content is now $h_6' \cdot 2 + h_5'$. This sequence proceeds until $h_0'$ is generated and added to the accumulator content, at which time the content equals $y_m$. It is then supplied to an output unit 15 as the output sample. Unit 15 may include a DAC to provide an analog output sample.

Figures 2G, 2H:
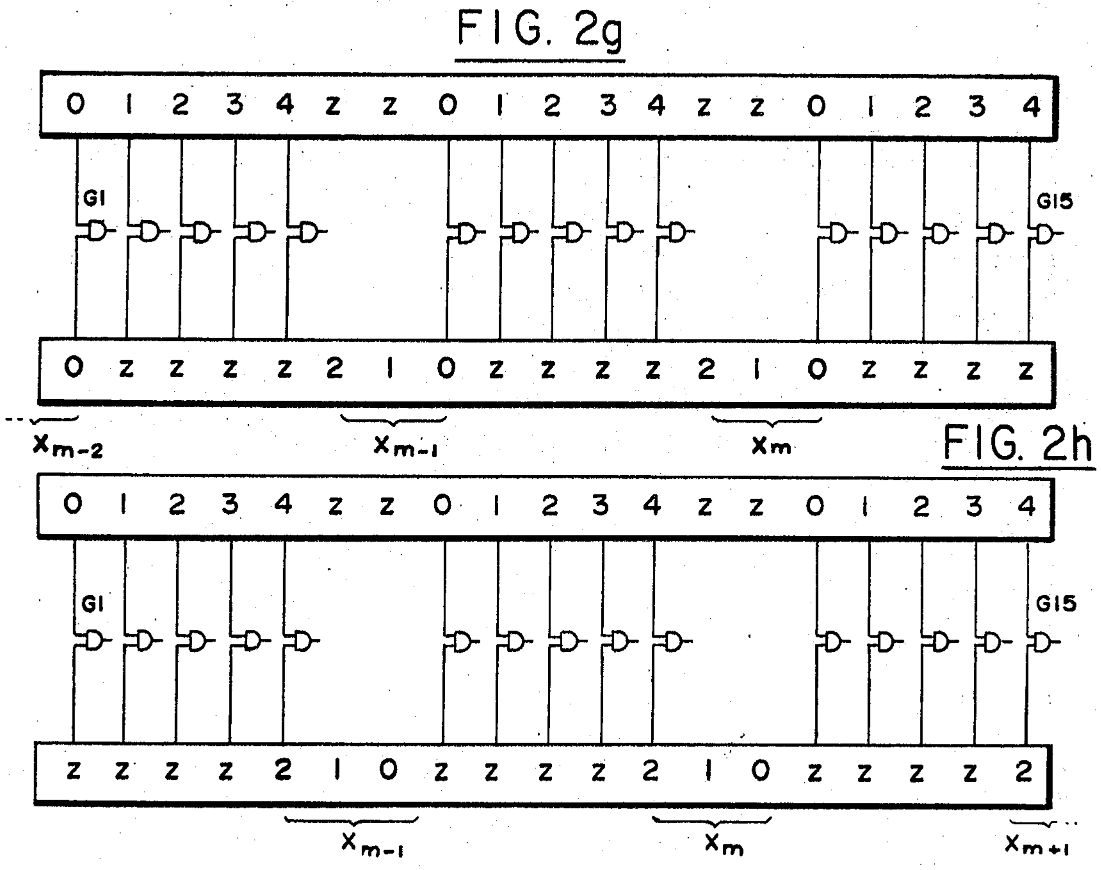

FIG. **2*h* is a presentation of the bit configuration one shift period after that shown in FIG. 2*g*, which represents the bit configuration needed to obtain $h_0'$ for $y_m$. In FIG. 2*h* the most significant bit of $x_{m+1}$ is in the right hand cell of register X. This configuration is the same as that of FIG. 2*a* which initiates the computation of $h_6'$ of $y_m$ except that in FIG. 2*h*** $m$ is now replaced by $m+1$. Hence, the sequence of operations described here automatically leads to the computation of $y_{m+1}$ following the computation of $y_m$ and so on.

It should be clear to those familiar with the art that various techniques and circuits may be used to control the shifting of the bits into register X, the interrogation of the AND gates G1–G15 to determine the number of TRUE gates and the shifting of the content of the accumulator 12 by one bit to the left and the addition of the number in counter 10 to the content thereof. For explanatory purposes such circuitry is represented in FIG. 1 by control unit 16. After supplying each shift or clock pulse to register X, unit 16 is assumed to supply a count-enabling pulse to the counter 10 to count the number of TRUE gates. This is followed by a shift pulse supplied to the accumulator 12, followed by an add pulse. In response to the latter pulse the content of the counter 10 is added to the accumulator and the counter is reset to zero. In the adopted example, after the seventh add pulse the output unit 15 is actuated to receive the count in the accumulator 12 representing $y_m$ and the accumulator is reset to zero. Thus it is ready to receive $h_6'$ of $y_{m+1}$.

It should be recalled that the basic design heretofore outlined is based on the assumption that both data and coefficients are non-negative (see equation (5)). As will be explained and described hereafter, the basic design may be employed with additional circuitry to accommodate both negative and positive data and coefficients. This is realizable by representing both data and coefficients in base (−2).

Considering the number 3 as an example, $$-3 = 1 \cdot 2^1 + 2 \cdot 2^0 = 11_2 = 1 \cdot (-2)^2 + 1 \cdot (-2)^1 + 1(-2)^0 = 11_{-2}.$$

Similarly, $$-3 = 1 \cdot (-2)^3 + 1 \cdot (-2)^2 + 0 \cdot (-2)^1 + 1 \cdot (-2)^0 = 1101_{-2}.$$

It is thus seen that both positive and negative numbers are accommodated with one and the same representation, i.e., in base (−2). With such a representation equation (10) will be replaced by the following:

$$\left.\begin{aligned} a_k &= \sum_{j=0}^{J_a-1} u_{kj}(-2)^j \qquad (u_{kj}=0,1) \\ x_k &= \sum_{j=0}^{J_x-1} v_{kj}(-2)^j \qquad (v_{kj}=0,1) \end{aligned}\right\} \quad (24)$$

This in turn leads to the modification of equations (13), (14) and (15) as follows:

$$\sum_{k=0}^{K-1} \sum_{i=0}^{J_a-1} u_{ki} v_{m-k,r-i} = h_r \quad (25)$$

$$y_m = \sum_{r=0}^{J-1} h_r(-2)^r \quad (26)$$

$$y_m = (\ldots (h_{J-1} \cdot (-2) + h_{J-2})\ (-2) + \ldots + h_1)\ (-2) + h_0 \quad (27)$$

It is thus seen that if such a negative binary representation is adopted for $\epsilon_k, \alpha_k$, the machine design herebefore described is still applicable, provided the sequence of operations in the accumulator, combining the counts, is modified so as to realize equation (27) rather than equation (15).

It should be stressed that both counter and accumulator are still standard positive radix devices and the output $y_m$ is still obtained in positive binary representation. The modification to realize equation (27) can be achieved quite simply by choosing an accumulator with a magnitude-sign bit. In such an accumulator as its content is shifted, to realize the multiplication by 2, the state of the sign bit is reversed simultaneously. If an accumulator of the complement type is chosen, after each shift is completed, the accumulator is driven to the complement state.

The adoption of negative binary representation requires further consideration. The filter coefficients $a_k$ are usually computed in a general purpose binary computer. Their negative binary representation can be obtained by incorporating in the coefficient program a subroutine, converting from positive binary to negative binary representation. A suitable algorithm for this subroutine is described in an article entitled "Negative Radix Conversion", authored by applicant. The article appeared in IEEE Transactions on Computers, Vol. C–19, No. 9, pp. 222–226, March 1970.

The situation with respect to the data, fed to the X register, is somewhat different. In FIG. 1 it is assumed that the data is already in digital form. In such a case a negative radix converter, designated by numeral 20 in FIG. 3, is interposed at the input to the X register. Such a converter is also described in the above-referred to article. If the data is in analog form a conventional ADC may be employed to convert the data into digital form which is then supplied to the converter 20.

Herebefore register A was shown as a single continuous register. This is a preferred arrangement although the invention should not be limited thereto. In principle the coefficients may be stored in K separate registers, each of $J_a$ bits. In practice however it is preferred to provide a single continuous register A for the coefficients and to cross-link each of its cells with a corresponding cell in register X. Such an arrangement would allow one and the same machine to perform filtering calling for widely different coefficient number (K) and and bits per coefficient ($J_a$). Also, by changing the coefficients in the course of the filtering process one realizes an adaptive filter.

In accordance with the present invention, the number of spacing zeros between successive coefficients is $J_x-1$. Thus for maximum flexibility the bit length of register A should be at least $KJ_a+(K-1)(J_x-1)$, where K is the largest number of expected coefficients, $J_a$ the longest expected number of bits per coefficient and $J_x$ the largest expected number of bits of each data word. The bit length of register X should equal the length of register A.

In such an arrangement each cell of register A should be cross-linked by an AND gate with a corresponding cell in register X. It should however be stressed that during any specific simulation only those gates, linked to cells in which coefficients are stored, need be interrogated to determine whether their outputs are TRUE. Thus, during any filtering operation only $KJ_a$ gates are interrogated.

In the foregoing example the first component which is obtained is $h_6$ ($h_{J-1}$), while the last component is $h_0$. This is due to the orders or the directions of increasing indices of the coefficients in the A register and the words in the X register. The invention is not limited to such an arrangement. In an embodiment to be described later the orders of the coefficients and data words are such that $h_0$ is the first component which is obtained and $h_{J-1}$ is the last obtained component. After describing all the embodiments the basic requirements for the directions of increasing indices of the coefficients and the words and the directions of increasing bit weights in the two registers will be discussed.

As is appreciated from the foregoing description each $h_r$ component is provided by first feeding into register X, an input bit or a spacing zero, associated with an input word, followed by counting $KJ_a$ AND gates, to determine the number of TRUE gates. Letting $N=KJ_a$, if $2^{M-1} \leq N < 2^M$, then the $KJ_a$ gates can be counted by a standard M-bit ripple counter with a clock time $T_c$.

In the following discussion of the various times and rates involved in the filter, let $f_b$ be the rate at which input bits are fed to the filter (bit rate). The corresponding period (bit time) $T_b$ is then $$T_b = 1/f_b. \quad (28)$$

From the previous discussions it is obvious that $T_b$ is also the period of the clock pulses controlling the X register shifts. Thus a bit time of $T_b$ is required to produce each $h_r$ component. During this period an input bit is fed into the X register, followed by the serial counting of the $KJ_a$ gates. Thereafter the accumulator performs a shift-and-add cycle. $T_b$ can be expressed as $$T_b = (KJ+1)T_c = (N+1)T_c. \quad (29)$$

The sampling rate $f_s$, of the analog input signal $\epsilon$, is related to $f_b$ by $$f_s = f_b/J \quad (30)$$

or equivalently, $$T_s = 1/f_s = JT_b = (J_x+J_a-1)T_b, \quad (31)$$

$T_s$ being the sampling time.

Of the sampling time, $J_xT_b$ is the time required to feed one data word into the X register while $(J_a-1)T_b$ is the time required to feed the associated $(J_a-1)$ spacing zeros.

The sampling time $T_s$ can be reduced significantly by reducing the bit time $T_b$. This can be accomplished by reducing the time required to count the $KJ_a$ gates. Assuming that the clock time $T_c$ is not reduced, the time required to count the $KJ_a$ gates can be reduced very significantly if all the gates are counted by a technique other than one in which all the $KJ_a$ gates are counted serially.

In one embodiment of the present invention a partitioned counting technique is employed to reduce the time required to count the N gates even though $T_c$ is not decreased. Briefly, in this embodiment the N gates are divided into a plurality of groups, which are counted in parallel. For explanatory purposes let P represent the number of groups. In interest of efficiency the number of gates in each group designated as $q$, is chosen so that $$q = 2^d - 1 \; (d = 2, 3 \ldots). \quad (32)$$

Thus P $d$-bit counters are required to count the N gates. Each counter counts the gates of the group associated therewith serially, while all the counters count corresponding bits in the different groups in parallel.

Figure 4:
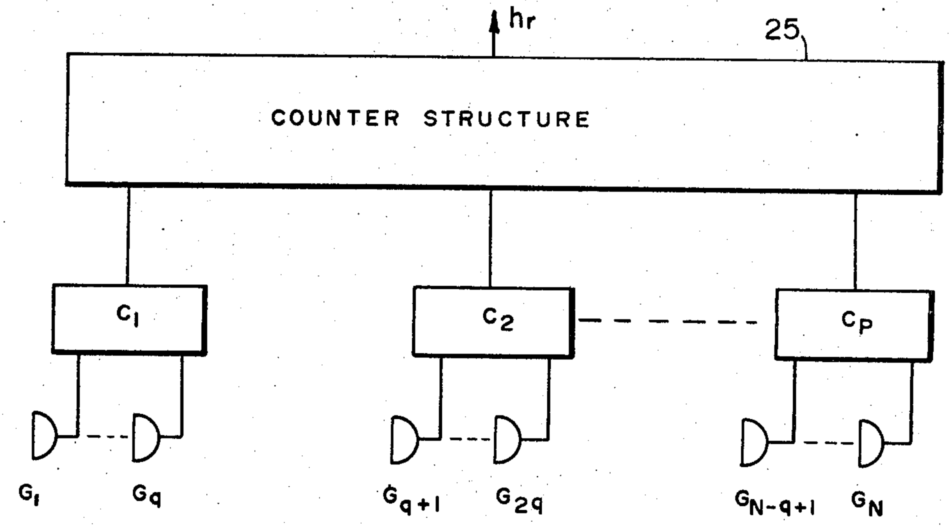
FIG. 4 is a partial block diagram of a partitioned counting embodiment of the invention.

Such an arrangement is shown in FIG. 4 to which reference is now made in which the N gates are designated $G_1$–$G_N$, with only $3q$ gates being shown connected to three of the P counters. To simplify FIG. 4, the inputs to the various gates from registers A and X are purposely deleted. The three counters are designated $C_1$, $C_2$ and $C_P$. The P $d$-bit numbers in the P counters are supplied to a counter structure 25 wherein they are combined in one or more levels of counters to provide a single multibit number representing the number of TRUE gates of the N gates, which represents one of the components of the desired output sample.

It should be appreciated that in such an arrangement the time required to count the N gates by the P $d$-bit counters is $qT_c$ since each counter counts only $q$ gates. In order to insure proper operation it is desired not to disturb the states of the gates for another period of $qT_c$ during which the contents of the P $d$-bit counters is transferred to the counter structure 25. However once this is accomplished a new bit can be clocked into the X register. Thus in such an arrangement $$T_b = (2q+1)T_c. \quad (33)$$

It thus follows that with the same clock time $T_c$, a speed increase over the embodiment with a single serial counter, is realized. The speed increases by a factor of $$(N+1)/(2q+1). \quad (34)$$

For large N and small $q$ ($q_{min}=3$), the factor by which the speed is increased may be quite large. It should however be appreciated that the increase of speed is realized at increased cost of the various counters needed to implement the partitioned counting.

High speed can also be attained without increased cost but at the price of reduced precision. This may be achieved in another embodiment of the invention to be described hereafter in which the counter 10, the accumulator 12 and the output unit 15 are incorporated in a single special digital-to-analog (D/A) device, which is generally designated by numeral 30 in FIG. 5, to which reference is now made.

Device 30 includes N identical resistors R each connected in series with a single pole single throw switch S between terminals 32 and 33. Each of the S switches is controlled by the states of a different one of the N AND gates. The switch is closed only when the gate's output is true, and remains open when the gate's output is false. The terminal 33 is connected to an integrator, consisting of an operational amplifier 35 and a feedback capacitor 36, while terminal 32 is connected to a voltage which is controlled by a J-position rotary switch $S_0$. The various potentials applied to terminal 32 are indicated at the switch's positions as powers of (−2). All voltages are referenced to ground.

Based on the foregoing description it should be appreciated that as each input bit is clocked into register X, the current fed to the integrator is proportional to $h_r(-2)^r$ and that the integrator output at point P builds up to the desired output, $$y_m=\sum_{r=0}^{J-1} h_r(-2)^r \quad (26)$$

For example, when the first bit of a data word is clocked into the X register the number of TRUE gates equals $h_{J-1}$ which is $h_6$ in the example herebefore described. Thus $h_6$ switches S will be closed. With switch $S_0$ connecting terminal 32 to a voltage proportional to $(-2)^6$, the current fed to the integrator is proportional to $(-2)^6 h_6$. After the fourth zero bit is clocked in register X, the current fed to the integrator is $(-2)^0 h_0$ so that the output of the integrator at point P is $y_m$. Prior to clocking the first bit of $x_{m+1}$, switch $S_b$ is closed to transfer the integrator output $y_m$ to the device's output terminal 40, through a low pass filter 42. Then, the capacitor 36 is discharged by connecting it to ground through switch $S_a$. Thus the integrator is ready to receive a current $(-2)^6 h_6$ of $y_{m+1}$.

It should be appreciated that in the device 30 all the N gates activate their respective switches simultaneously. This scheme is thus analogous to counting all the N gates in parallel. Therefore this embodiment is faster than the one with the partitioned counting. It is considerably less costly since it does not require the many counters required for the partitioned counting. However, the increased speed of this embodiment is achieved at the price of lower precision, characteristic of all analog devices.

Figure 5:
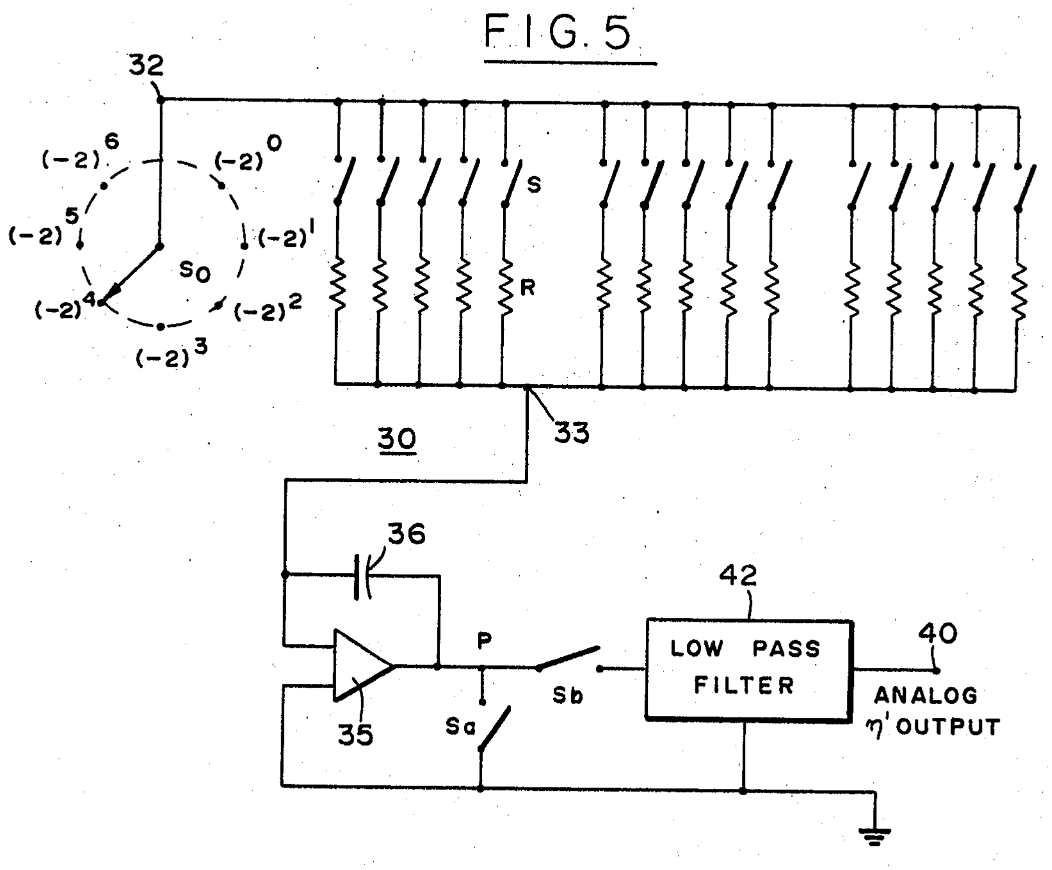
FIG. 5 is a block diagram of another embodiment of the invention.

It should be stressed that the mechanical switches shown in FIG. 5 are presented for explanatory purposes only. In practice to attain the desired high speed of operation all switches are implemented by well known electronic switching devices.

In each of the three embodiments herebefore described, $KJ_a$ gates are required. The last two embodiments are capable of relatively high speeds of operation. The embodiment, employing partitioned counting, is capable of being operated at speeds greater than the possible speed of the first basic embodiment at the price of increased cost. The last described embodiment is also capable of a high operating speed without a significant increase in cost but at the price of reduced precision. The first embodiment even though it includes $KJ_a$ gates is of relatively low speed since therein $KJ_a$ gates are counted serially. In accordance with the teachings of the present invention a filter with a speed comparable to that of the first embodiment may be implemented with a single AND gate rather than $KJ_a$ gates.

Such an embodiment will now be described in connection with FIGS. 6$a$ through 6$c$. Therein the single AND gate is designated as $G_s$. Register A in which the $k$ coefficients $a_k$ are stored is assumed to be a circulating line in which the output of the left hand bit is fed back to the right hand bit via line 50. Register X is also a circulating line, including an extra cell B into which an input data bit or the output of the left hand cell of register X is fed under the control of a single pole double throw switch $S_s$.

In the present embodiment each coefficient is stored to the left of a coefficient of a higher value of $k$ and the bits of each data word are clocked into bit B successively with the lowest power bit first. In this embodiment it is $h_0$ rather than $h_{J-1}$ which is the first to be computed.

In operation as the two registers are swept in step past gate $G_s$ its output is true only if the two gate-feeding cells stored bits which are binary 1's. As will be explained later each time the gate's output is true a count is automatically counted in a modified up-down counter. After each $h_r$ is derived the content of this counter equals the summation of all the lower valued $h_r$, in accordance with equation (26). For example after $h_2$ is derived the content of the counter is the combination of $h_2$, $h_1$ and $h_0$ in accordance with equation (26). Thus when $h_{J-1}$ is obtained the counter's content is $y_m$ in digital form.

FIG. 6$a$ shows the bit configuration following the evaluation of the first term of $h_0$ of $y_m$. Bit 1 of $x_m$ is in cell B. As the two registers are swept in step past the single gate $G_s$, the remaining terms of $h_0$ are evaluated. During all these operations, switch S remains as shown in FIG. 6$a$ so that any bit, shifted out of the gate feeding cell of register X, lands in cell B.

Figure 6A:
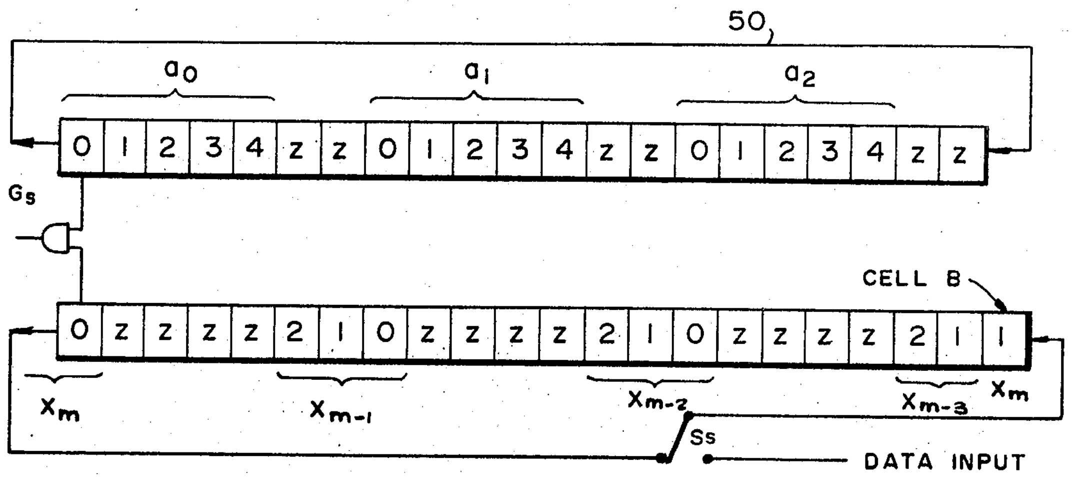
FIGS. 6*a* through 6*c* are diagrams useful in explaining an embodiment of the invention with a single AND gate.
Figure 6B:
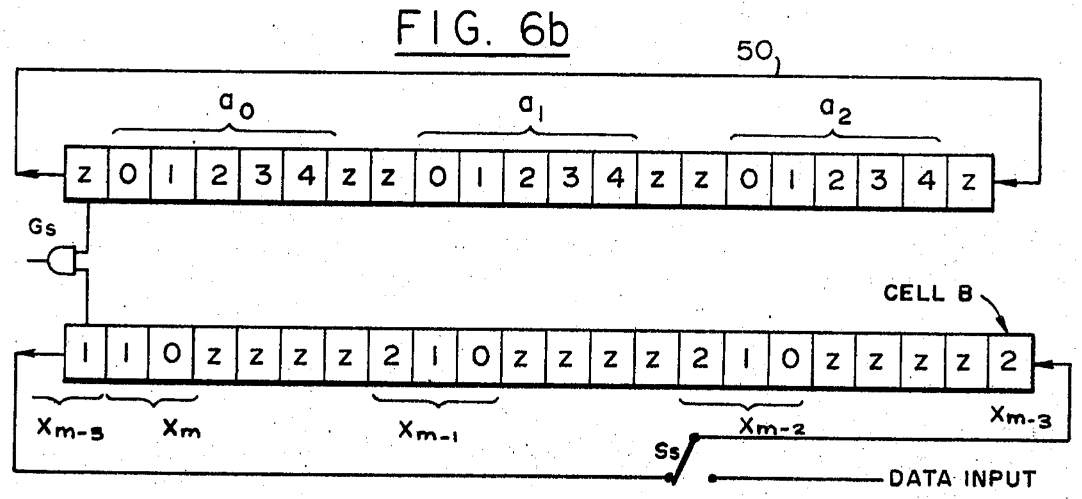

FIG. 6b shows the bit configuration following the evaluation of the last term of $h_0$ of $y_m$. It should be noted that switch $S_s$ now connects to the right. This means that is the next shift, bit 1 of word $x_{m-3}$ will be lost and cell B will be loaded with the next data input bit, i.e., bit 2 of $x_m$. This new bit configuration is shown in FIG. 6$c$. As seen switch $S_s$ has now returned to its left position and the filter is in position for the evaluation of the first term of $h_1$ of $y_m$.

Figure 6C:
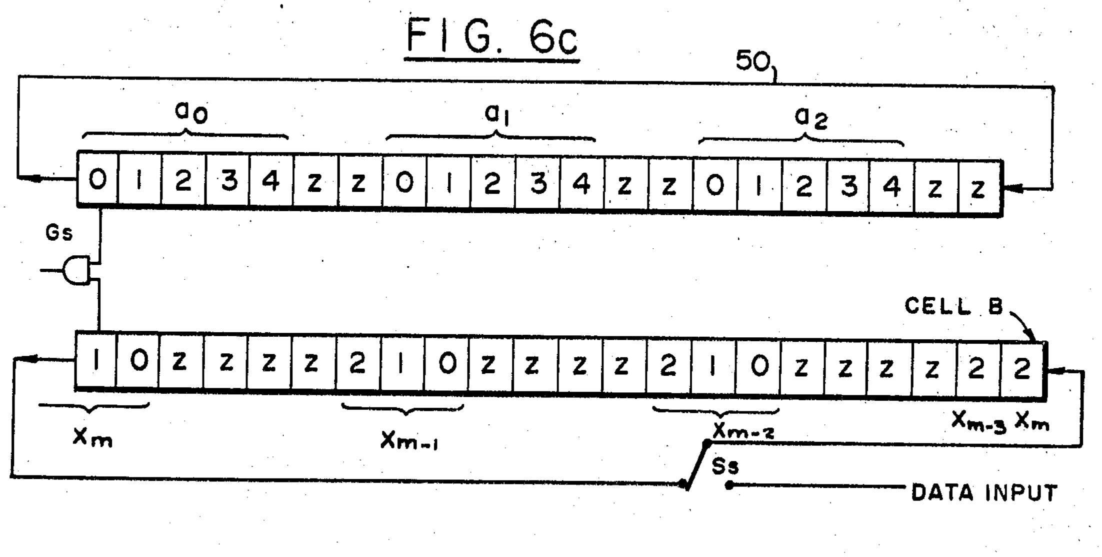

The time difference between FIGS. 6a and 6c corresponds to one full revolution of the coefficients' line. Hence, these fingers represent the bit configuration that would emerge in "strobing" the lines to "freeze" the motion of the coefficients line. The resulting pattern in the X register (excluding cell B) is a 1-bit shift to the right with a new bit being fed on the left and the oldest bit being ejected on the right. This is almost identical with the basic pattern shown in FIG. 1. The only difference is in the shift direction since the order of computing the $h_r$'s is now the reverse of that of FIG. 1.

Figure 7:
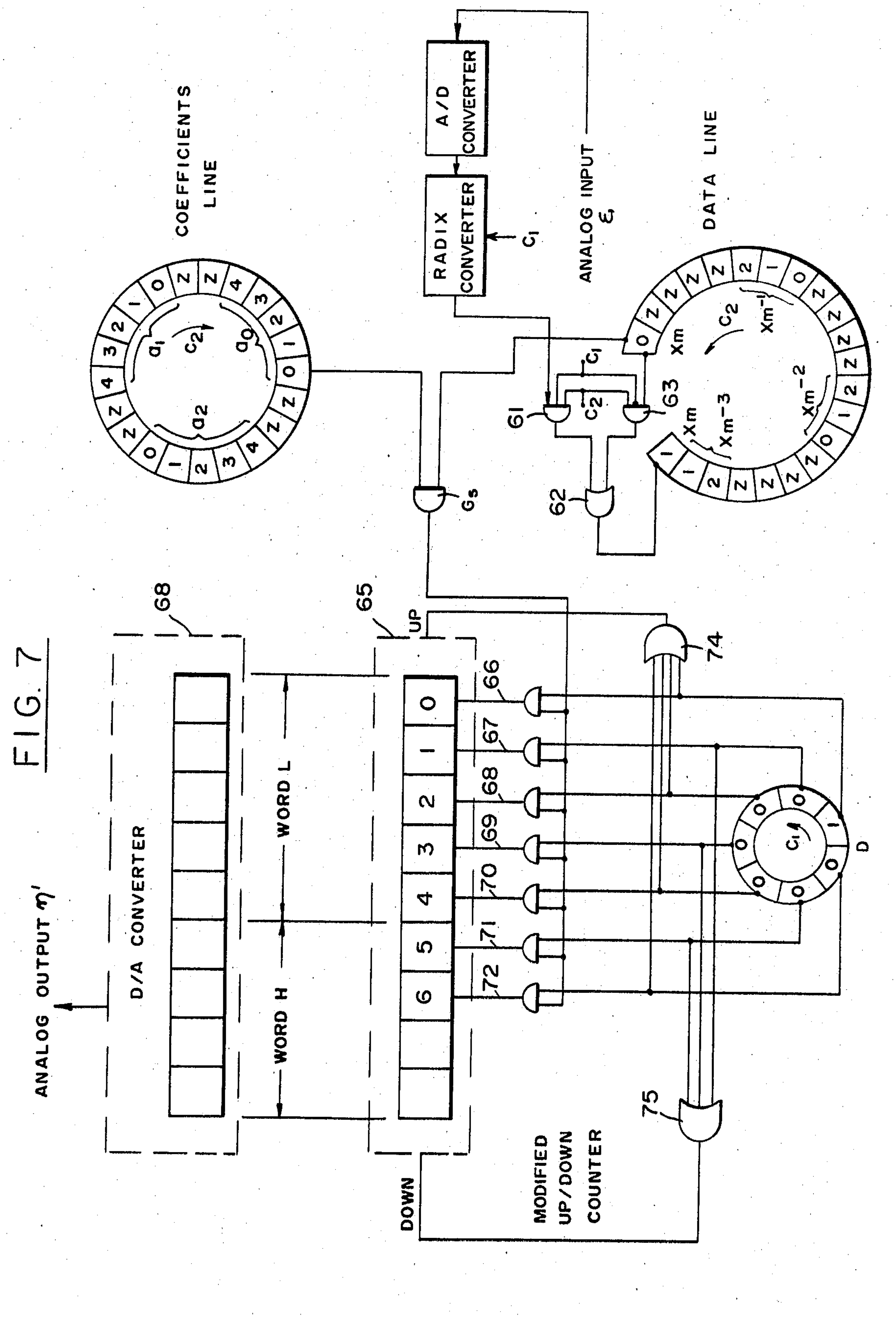
FIG. 7 is a complete diagram of the embodiment with the single gate.

A complete implementation of the present embodiment will now be described in connection with FIG. 7. The right part of this figure is essentially a redrawing of FIG. 6a. Switch $S_s$ of that figure is replaced here with an implementation using three gates controlled by clock sequences $c_1$, $c_2$. Sequence $c_2$ steps the circulating lines while clock $c_1$ controls the serial radix converter and hence the rate of feeding new bits.

As already seen, counting the TRUE outputs of gate $G_s$ over the proper time interval, will yield $h_r$. This counting as well as the assembly of counts to get the output word $y_m$, is implemented in a modified up-down counter 65. Unlike the standard up-down counter which accepts inputs into bit 0 only, here inputs are delivered to the other bits too. This is permissible as long as only one input at a time is activated and the rate of input is sufficiently low that rippling through of carries resulting from the last bit fed, has terminated before a new bit is applied.

The effect of the above modification is that rather than counting (up or down) by ones only, this counter can count by any power of 2. This immediately suggests its application in the construction of the output word $y_m$ according to equation (26). All that is required is to steer the sequence of bits coming out of gate $G_s$ to the proper input terminal and properly set the (up-down) mode of counting. Specifically, bits comprising $h_0$ should be steered to input 0, counting up, bits comprising $h_1$ should be steered to input 1, counting down and so on. As long as the counter does not overflow, this automatically yields the correct $y_m$ with negative numbers appearing in their 2's complement representation. This means that the counter output can be fed directly to the DAC 68 to produce the analog output.

Steering the output of gate $G_s$ to the proper counter input is controlled by circulating line D which controls gates 66–72. It has $J=7$ cells. One of these is set to one. The rest are set to zero. Being controlled by clock $c_1$, line D automatically enables bit $r$ input when the bits comprising $h_r$ are coming out of gate $G_s$. Circulating line D also controls the up-down mode in an obvious way using two OR gates, 74 and 75.

Transfer of the final output to the DAC 68 poses an interesting problem. In principle, this could be done in two count cycles, one for copying out and one for zeroing the counter in preparation for the next word. This would entail, however, interruption of the flow of input bits during these two cycles. It is preferred to implement the data transfer and initialization without interrupting this flow. This can be achieved by the simple expedient of segregating the counter flip-flops into words L and H as shown in FIG. 7 and transferring the data from these two words at different times. Word L is copied out simultaneously with activating the gate connected to the lowest bit of word H. Zeroing of word L follows in the next count cycle. Word H is copied out immediately after its assembly is complete, that is, simultaneously with the entry (to the counter) of the first bit of the next filter output word. Zeroing of word H follows in the next count cycle.

To understand why this scheme works, it should be noted that the counter input gates are activated in a sequence leading from the low order bits to the high order bits. This means that by the time any gate connected to word H is activated, the assembly of word L is complete and it may be copied out. Furthermore, in assigning the partitioning into words H, L, one makes sure that the lowest bit of H has an odd weight. This means that when the first H gate is accessed, the counter is in a down-counting mode. In this mode, a $1 \rightarrow 0$ change in flip-flop $i$ does not affect flip-flop $i+1$. Hence, zeroing of word L has no effect on word H. Similarly, entry of the first two bits of the new word (with gate 66 activated) affects at most bit 1 and thus the copying out and zeroing of word H are not disturbed.

This two-word method would not be applicable in a system where the higher weights are computed first as in the previously discussed embodiments. This is the motivation for the input bit sequence adopted here. The basic characteristics of this design, however, are independent of the input sequence adopted.

Attention is now directed to the operational details. FIG. 6a indicates that each filtering task will require a specific number of cells in the circulating lines [$K(J_a+J_x-1)$ for the coefficients line and $1+K(J_a+J_x-1)$ for the data line]. An important feature of a practical implementation would therefore be an array of line segments of various lengths which are to be switched into the circulating lines by the machine operator. The flexibility and possibilities of such an arrangement are quite attractive. Yet, all of this is obtained with a relatively modest investment in hardware.

The major disadvantage is of course the low speed. Let $T_o$ be the period of clock $c_2$ stepping the circulating lines. In discussing FIG. 6a, it was seen that a new input bit is fed with each revolution of the coefficients line. Hence, $$T_b = K(J_a+J_x-1)T_o \qquad (35)$$

and $$T_s = K(J_a+J_x-1)^2 T_o. \qquad (36)$$

Obviously the penalty for reducing the amount of hardware, i.e., cost and complexity is at the price of reduced speed.

In all of the foregoing embodiments fixed point representation was assumed for the filter coefficients $a_k$. The invention however is not limited thereto and it may be implemented to accommodate floating point representation for the coefficients. Let the ratio of the largest $|\alpha_k|$ to the smallest $|\alpha_k|$ be $\rho$. If $\rho$ is a large number than even though a very small number of bits is allotted to the smallest $|\alpha_k|$, $J_a$ is still large. This is disadvantageous for two reasons.

a. It reduces the sampling rate $f_s$, b. $N=KJ_a$, the number of gates to be counted is increased, sharply increasing cost. One can employ a strategy which provides an answer to (b), while accepting the reduced sampling rate. To illustrate the strategy let it be assumed that it is desired to assign 5 bits to each coefficient and that this satisfies the lowest $|a_k|$. However 20 bits are needed to satisfy the highest $|a_k|$. The A and X registers are organized on the basis of $J_a=20$. However, the gates and the counters are attached only to the 5 most significant bits of each $a_k$. This is equivalent to the adoption of a floating point representation for the coefficients.

In the foregoing example $J_a$ as far as the number of gates is concerned is only 5. Thus the number of gates is 5K rather than 20K. However as far as the number of components of each output sample is concerned $J_a$ is 20 and $J=J_x+20-1$. Thus the sampling rate is reduced due to the organization of the two registers on the basis of $J_a=20$ needed to represent the largest $|a_k|$.

The best way of implementing the above strategy is to use a single, sufficiently long, A register for the coefficients. The connections of its cells to the gates may be controlled by relays or switches under the control of the machine operator. Basically from the foregoing example the operator selects which five cells of each group of 20 cells assigned to each coefficient are to be connected to 5 of the 5K gates. The above described strategy is particularly applicable to the partitioned counting embodiment.

The reduced sampling rate when the above-described strategy is employed can be eliminated if floating point representation is incorporated in an embodiment similar to the one shown in FIG. 5. Let the representations $$a_k = a_k'(-2)^{e_K}$$
$$e_k = \{0, 1, 2, \ldots, E-1\} \qquad (37)$$

be adopted. Therein $a_k'$ is an integer representable by $J_a'$ bits in a $(-2)$ radix representation. The idea is to load the A register with $a_k'$, base the bit pattern in registers A, X on $J_a'$ (not $J_a$), and let $e_k$ control the voltages.

Figure 8:
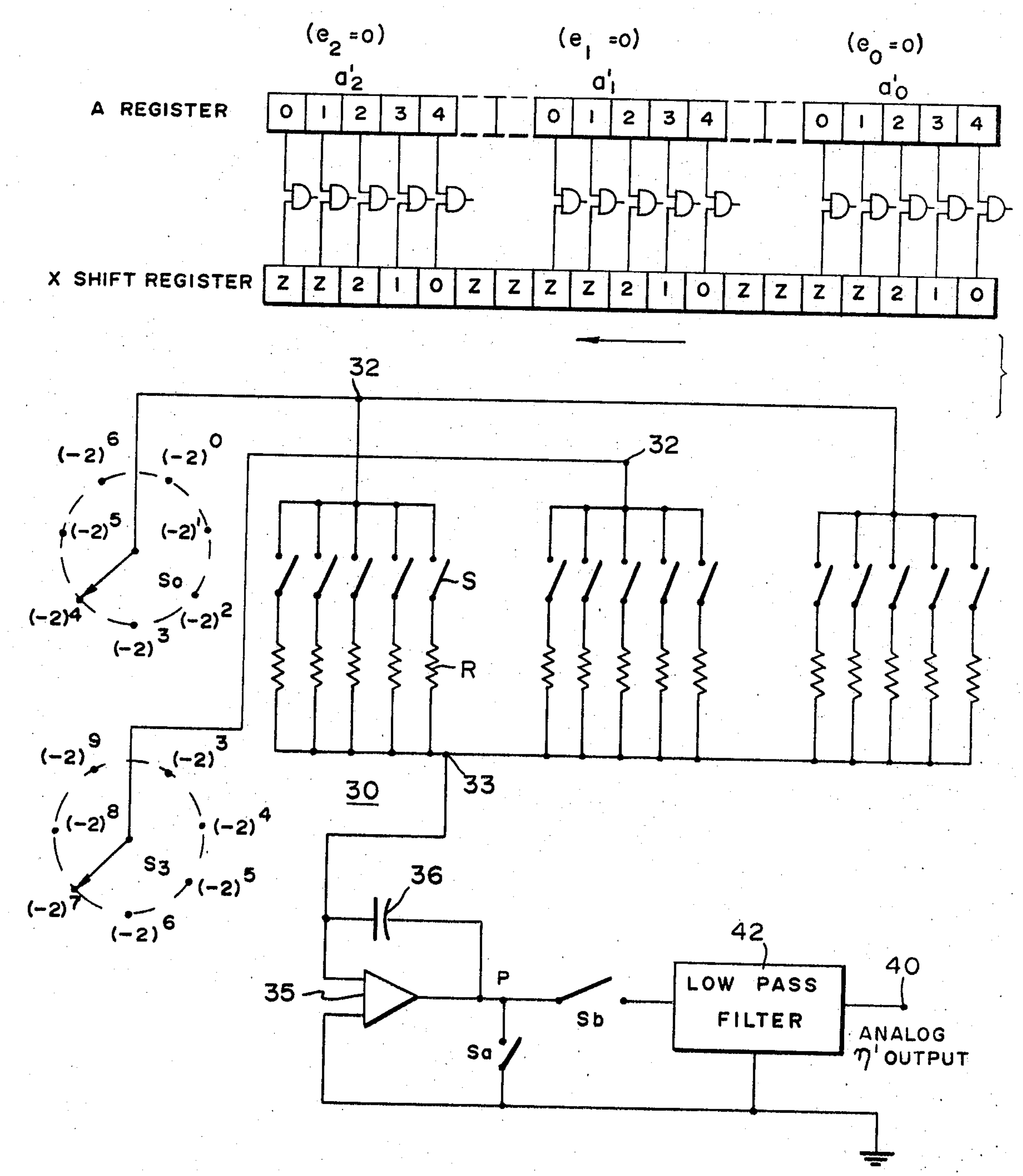
FIG. 8 is a block diagram of the embodiment shown in FIG. 5 for floating point representation.

An example ($J_a'=5$) is shown in FIG. 8. Therein it is assumed that $e_0=e_2=0$. Hence the voltages controlled by $a_0'$, $a_2'$ are fed by distributing switch $S_o$ identical with that of FIG. 5. With $e_1=3$, the voltages controlled by $a_1'$ are fed by a different distributing switch, $S_3$. Note that each voltage input to this switch is obtained by multiplying the corresponding voltage of $S_o$ by $(-2)^3$. Obviously, this arrangement realizes the heavier weights to be associated with the bits of $a_1'$.

In general, E distributing switches will be required. These represent the bulk of the extra hardware. The allocation of the gate controlled switches to the various distributing switches has to be done by the operator at the time of loading the coefficients.

As seen from the foregoing description each embodiment includes a pair of registers A and X. The former contains the filter coefficients $a_k$, and the latter, which is a shift register, contains several data words. Each data word and spacing zeros are fed into the shift register bit by bit. The number of spacing zeros between adjacent words in the X register is $J_a-1$. If register A is one continuous register, the number of spacing zeros between coefficients is $J_x-1$.

The coefficients in register A must be stored in a monotonic coefficient index sequence, and similarly the data words in register X must be stored in a monotonic word index sequence. The direction of increasing coefficient index in register A must be opposite the direction of increasing word index in register X. In the embodiment described in connection with FIG. 1, the direction of increasing coefficient index is to the left ($a_2, a_1, a_0$) and that of the data words is to the right ($x_{m-2}, x_{m-1}, x_m$). In such an embodiment $h_{J-1}$ is the first to be produced. On the other hand, in the embodiment described in connection with FIG. 6a, the direction of increasing coefficient index is to the right ($a_0, a_1, a_2$) and that of the words is to the left ($x_m, x_{m-1}, x_{m-2}$). In this embodiment $h_0$ is the first component which is obtained.

In addition, the direction of increasing bit weight in each coefficient in the A register must be opposite to that in each word in the X register. In the foregoing embodiments the direction of increasing bit weight in the A register is to the right and that in the X register is to the left.

Each of the embodiments, except the one with the circulating lines, includes $KJ_a$ AND gates which cross-link the two registers. After each bit of a data word or a spacing zero is fed into the X register the TRUE AND gates are counted to provide an output sample component $h_r$. All the J components for each data word are combined in an accumulator to provide the output sample.

Although particular embodiments of the invention have been described and illustrated herein, it is recognized that modifications and variations may readily occur to those skilled in the art and consequently it is intended that the claims be interpreted to cover such modifications and equivalents.

What is claimed is:

1. A digital filter comprising:

first register means for storing K filter coefficients, each of $J_a$ bits, both K and $J_a$ being integers, the $k$th filter coefficient being represented by the integer $$a_k = \sum_{j=0}^{J_a-1} u_{kj} B^j$$

wherein $u_{kj}=0$, 1 and B is one of the group consisting of +2 and −2;

a shift register for storing multibit data words, each of $J_x$ bits, said $J_x$ bits of each word being shifted therein one bit at a time, the $k$th data word being represented by the integer $$x_k = \sum_{j=0}^{J_x-1} v_{kj} B^j$$

wherein $v_{kj}=0$, 1;

means, including counting and gating means, cross-linking said first register means and said shift register for providing each of J components of an output sample as a function of the AND function of selected bits stored in said first register means and said shift register; and accumulator means for providing an output sample which is a function of said J components, $J=J_a+J_x-1$.

2. The filter as recited in claim 1 wherein each output signal component is definable as $$(h_r)_m=\sum_{k=0}^{K-1}\sum_{i=0}^{J_a-1} u_{ki}v_{m-k,\,r-i}$$

$u_{ki}$ being the coefficient of $B^i$ in the representation of the filter coefficient $a_k$ and $v_{m-k,\,r-i}$ is the coefficient of $B^{r-i}$ in representation of the data word $x_{m-k}$, each product $u_{ki}v_{m-k,\,r-i}$ being a binary quantity, and said means, including counting and gating means, providing said signal component by counting those of the binary quantities, which are 1's.

3. The filter as recited in claim 2 wherein each data word has associated therewith $J_a-1$ spacing zero bits, whereby in said shift register data words are spaced by $J_a-1$ spacing zero bits and each of said $(h_r)_m$ components is produced by counting those binary quantities which are 1's after a bit of an input data word or a spacing zero bit associated therewith are fed into said shift register.

4. The filter as recited in claim 3 wherein the output sample provided by said accumulator means is definable as $$y_m=\sum_{r=0}^{J-1} h_r B^r$$

5. The filter as recited in claim 4 wherein said accumulator means provide said output sample $y_m$ in accordance with the relationship $y_m=((h_{J-1}B+h_{J-2})\,B+\ldots h_1)\,B+h_0$, wherein $h_0$ through $h_{J-1}$ represent the J counts received from said counting means.

6. The filter as recited in claim 4 wherein said gating means include $KJ_a$ two-input AND gates cross-linking said first register means and said shift register and said counting means are coupled to said $KJ_a$ gates for providing a count of the AND gates having TRUE outputs, said count representing one component $(h_r)_m$, of said output sample, said accumulator means being coupled to said counting means for providing said output sample as a function of the J counts received from said counting means.

7. The filter as recited in claim 6 wherein $B=-2$.

8. The filter as recited in claim 6 wherein said accumulator means provide said output sample $y_m$ in accordance with the relationship $y_m=((h_{J-1}B+h_{J-2})\,B+\ldots h_1)B+h_0$, wherein $h_0$ through $h_{J-1}$ represent the J counts received from said counting means.

9. The filter as recited in claim 8 wherein $B=-2$, and wherein said accumulator means includes a sign bit which is reversed each time a count is received by said accumulator means from said counting means.

10. The filter as recited in claim 6 wherein said counting means comprises a plurality of counters including a group of counters each serially counting a different group of TRUE AND gates out of said $KJ_a$ gates, with all of said counters in said group counting corresponding gates in parallel, with the rest of said counters combining the contents in said group of counters into a single count representing a component of said output sample.

11. The filter as recited in claim 10 wherein said accumulator means provide said output sample $y_m$ in accordance with relationship $y_m=((h_{J-1}B+h_{J-2})\,B+\ldots h_1)B+h_0$ wherein $h_0$ through $h_{J-1}$ represent the J counts received from said counting means.

12. The filter as recited in claim 11 wherein $B=-2$, and wherein said accumulator means includes a sign bit which is reversed each time a count is received by said accumulator means from said counting means.

13. The filter as recited in claim 11 wherein said $KJ_a$ gates are divided into P substantially equal groups, the number of gates in each group being equal to $q$, wherein $q=2^d-1$ and wherein each counter in said group of counters is a $d$-bit binary counter, both $q$ and $d$ being integers.

14. The filter as recited in claim 13 wherein $B=-2$, and wherein said accumulator means includes a sign it which is reversed each time a count is received by said accumulator means from said counting means.

15. The filter as recited in claim 4 wherein said counting and gating means include $KJ_a$ two-input AND gates cross-linking said first register means and said shift register, and signal producing means for providing each component as an analog signal having a value $h_r$ $B^r$, and said accumulator means comprises means for accumulating said J components from $r=0$ to $r=J-1$ to provide said output sample.

16. The filter as recited in claim 15 wherein said signal producing means include $KJ_a$ equal resistors connected in parallel between first and second terminals, each resistor being connected in series with a separate switch means between said terminal, each switch means being closed to provide a current path thereacross when the output of an AND gate associated therewith is TRUE, means coupled to said first terminal for providing a potential proportional to $B^r$ as the component $(h_r)_m$ is produced, whereby the total current amplitude passing through said $KJ_a$ resistors is proportional to $h_rB^r$, and said accumulator means is a current integrator connected to said second terminal for providing said output sample $y_m$ after integrating the currents representing said J components.

17. The filter as recited in claim 16 wherein $B=-2$.

18. The filter as recited in claim 4 wherein said gating means include $KJ_a$ two-input AND gates cross-linking said first register means and said shift register and said counting means comprises a single counter coupled to said $KJ_a$ gates for serially counting said gates to provide a count of the AND gates having TRUE outputs, said count representing one component of said output sample, said accumulator means being coupled to said counting means for providing said output sample as a function of the J counts received from said counting means.

19. The filter as recited in claim 18 wherein $B=-2$.

20. The filter as recited in claim 18 wherein said accumulator means provide said output sample $y_m$ in accordance with the relationship $y_m=((h_{J-1}B+h_{J-2})B+\ldots h_1)B+h_0$, wherein $h_0$ through $h_{J-1}$ represent the J counts received from said counting means.

21. The filter as recited in claim 20 wherein $B=-2$, and wherein said accumulator means includes a sign bit which is reversed each time a count is received by said accumulator means from said counting means.

22. The filter as recited in claim 4 wherein said first register means comprises a first circulating line with $J_x-1$ spacing zero bits between adjacent filter coefficients, said gating means comprises a single two-input AND gate coupled to one cell of each of said first circulating line and said shift register, and means coupled to the input and output cells of said shift register for controlling the supply to said input cell, of the content of the output cell or an input bit.

23. The filter as recited in claim 22 wherein the counting means and the accumulator means comprise a multistage counter coupled to said single gate to receive a count of one each time the gate output is TRUE and control means coupled to said counter for controlling the stage of the counter which receives said count as a function of the component being produced.

24. The filter as recited in claim 23 wherein $B=-2$, said counter is an UP-DOWN counter and said control means controls said counter to count down when $r$ is odd and up when $r$ is other than odd.

* * * * *